United States Patent [19]

Lloyd

[11] 4,108,446

[45] Aug. 22, 1978

[54] PIPE COUPLING SOCKET ASSEMBLIES

[76] Inventor: Peter Frederick Victor Lloyd, 4, Mynchen End, Beaconsfield, Buckinghamshire, HP9 2AT, England

[21] Appl. No.: 639,343

[22] Filed: Dec. 10, 1975

[30] Foreign Application Priority Data

Sep. 2, 1975 [GB] United Kingdom ............... 36105/75

[51] Int. Cl.$^2$ .............................................. F16J 15/10
[52] U.S. Cl. ............................. 277/101; 277/DIG. 2; 285/230; 285/345
[58] Field of Search ............... 285/DIG. 22, 379, 423, 285/345, 230, 231, 118, 156; 277/207, DIG. 2, 101

[56] References Cited

U.S. PATENT DOCUMENTS

| 3,645,547 | 2/1972 | Glover | 285/345 |
| 3,924,881 | 12/1975 | O'Connor | 285/345 |

*Primary Examiner*—Robert I. Smith

[57] ABSTRACT

A plastics material pipe coupling socket having a sealing ring locked in position in the socket by a locking ring. The locking ring is of channel section and is snap-fitted to the socket with the socket mouth snugly received in a recess in the channel base. A substantially enclosed annular space is defined between the locking ring and the socket. The sealing ring comprises an annular portion located in said annular space, a neck extending through the entrance to said annular space, and a sealing head.

13 Claims, 1 Drawing Figure

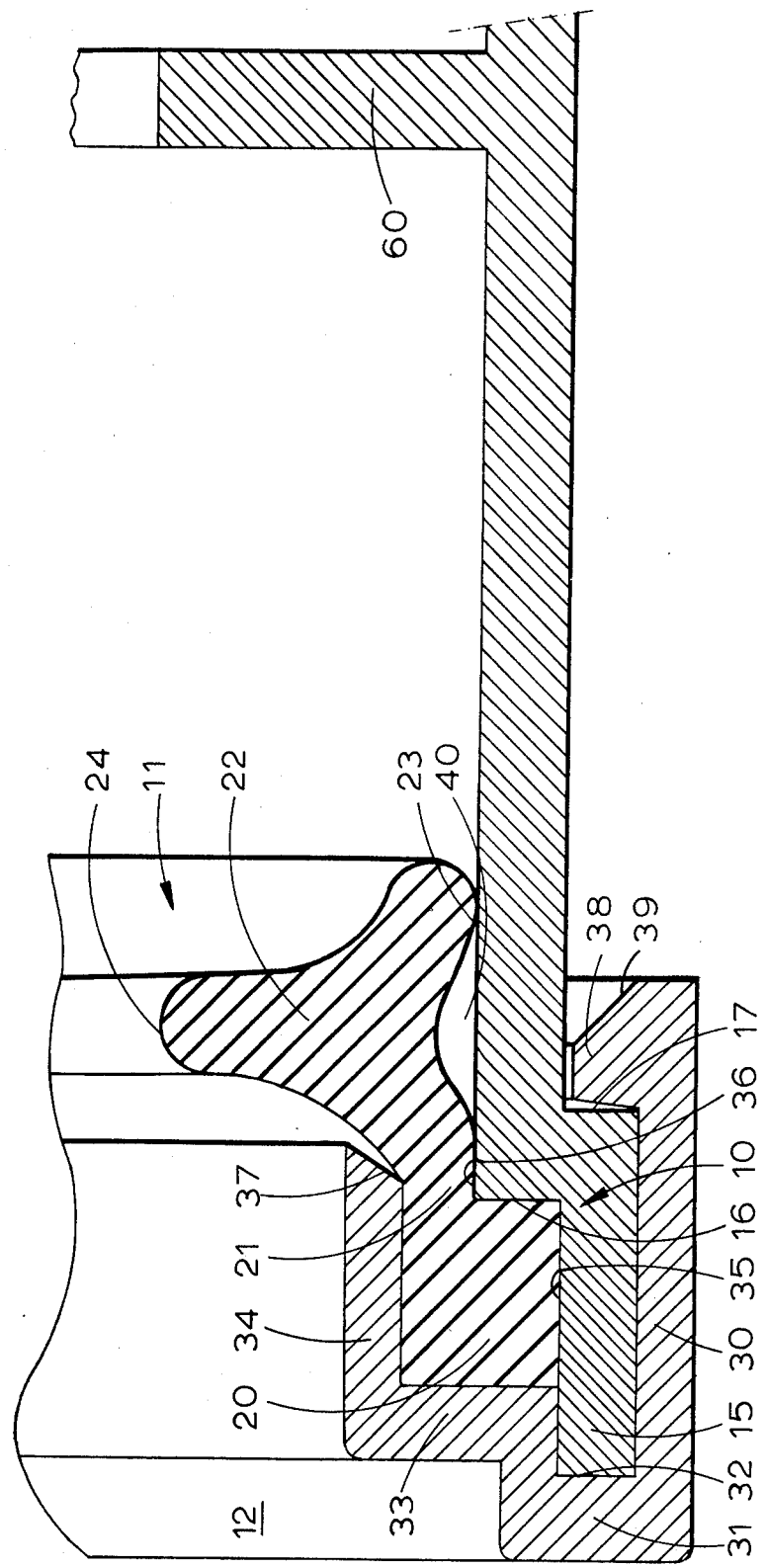

PIPE COUPLING SOCKET ASSEMBLIES

This invention relates to pipe coupling socket assemblies. Such socket assemblies may form part of coupling sleeves for coupling two pipe lengths together, including reducing couplings, or part of pipe junction fittings for couplings three or more pipe lengths, or part of a pipe length having its outer end plain or spigoted. The invention is particularly applicable to socket assemblies for coupling clay ware pipes or plastics material pipes, as used in soil pipes, waste pipes, sewers and drains for example.

According to the present invention there is provided a pipe coupling socket assembly comprising a sealing ring locked in position within a socket by means of a locking ring of channel section secured to said socket, the locking ring comprising an outer flange extending adjacent the outer surface of the socket, a first radially outer base portion defining an annular recess receiving the mouth of the socket, a second radially inner base portion, and an inner flange, said second base portion and said inner flange of the locking ring co-operating with the inner surface of the socket to define a substantially enclosed annular space receiving and locating an annular portion of the sealing ring.

An embodiment of the invention will now be described by way of example, with reference to the single FIGURE of the accompanying drawings, which is a fragmentary longitudinal section of a pipe coupling assembly according to the invention.

In FIG. 1 a pipe coupling socket assembly comprises a socket 10 and a sealing ring 11 locked in position within the socket by means of a locking ring 12. The socket has an enlarged diameter end length terminating in the mouth 15 of the socket. The socket 10 is of substantially uniform wall thickness and thus, at the point of increasing diameter, its inner surface presents an inner radial annular surface portion 16 and its outer surface presents an outer radial annular surface portion 17 facing respectively towards and away from the mouth 15.

The sealing ring 11 is of elastomeric material and comprises an annular rectangular section portion 20 connected by an annular neck portion 21 to an annular sealing head 22 which lies further within the socket than the portion 20 and which is generally triangular in cross-section each of its three major faces being concave, and is connected to portion 20 by the neck portion 21 at one apex. The other two apices are rounded, one abutting the inner surface of the socket at 23 and the other, 24, extending radially inwardly for deformation and sealing engagement with a pipe introduced in use into the socket.

The locking ring 12 comprises an outer flange 30 extending adjacent the outer surface of socket 10, a first radially outer base portion 31 defining an annular recess 32 snugly receiving the mouth 15, a second radially inner base portion 33, and an inner flange 34. As shown, the portion 33 has an inner surface facing socket surface 16, and the inner flange 34 has a surface facing an inner surface 35 of the socket. There is thus defined, within the socket, a substantially enclosed annular space of rectangular cross section having an annular entrance 36.

The inner edge of the inner flange 34 is preferably bevelled at 37 as shown. The inside surface of the inner flange 34 is shown longer than the socket surface 35, but in other embodiments it may be shorter, or substantially the same length. The outer flange 30 includes an inwardly directed circumferential projection 38, having a bevelled leading edge 39, arranged for snap-fitting engagement over the enlarged diameter end length of the socket.

In use the portion 20 of the sealing ring is received and located in said substantially enclosed annular space formed when the locking ring is snapped into position. A neck portion 21 extends through the entrance 36. The portion 20 is preferably dimensioned to be a tight fit within the annular space.

When a pipe enters the socket the sealing head 22 deforms to seal around and accommodate dimensional variations in the pipe diameter. The apex 24 can bend inwardly of the socket and towards apex 23, and the head 22 can deform as a whole generally radially outwardly with the material thereof able to move into and fill an annular groove 40, while apex 23 moves axially. This combination provides a particularly effective seal able to accommodate substantial pipe diameter variations and axial and angular misalignment of pipe and socket.

It will however be appreciated that the sealing head 22 may be of different shapes to suit different applications.

The seal head has wider application and we therefore disclose a seal ring for a pipe coupling socket assembly, the seal ring comprising a portion shaped for locking in position relative to the assembly, a sealing head, and a neck portion connecting the locking portion and the seal head, the head being generally triangular in cross-section, each of its three major faces being concave, and one apex merging into said neck portion.

The socket is preferably provided with an internal flange 60, which may be discontinuous, to limit the extent of insertion of a pipe and to prevent the ends of the pipes being forces against each other and causing locking or damage.

The locking ring has been described as snap-fitting; it may however be secured to the socket by other suitable means. For example a double snap-fitting may be provided by means of two continuous or interrupted circumferential external ribs on the enlarged end portion of the socket with complementary continuous or interrupted double grooves in the locking ring; alternatively by means of two continuous or interrupted grooves in the enlarged portion of the socket with complementary continuous or interrupted ribs on the inner face of the outer flange of the locking ring. The locking ring may be brought into the locked snap-fitted position by rotation of a cam portion on the locking ring operating in a cam slot in the outer surface of the socket; alternatively by rotation of a slot on the locking ring over a cam on the outer socket surface. The locking ring may be screwed onto the socket by continuous or interrupted threads; castellations on the locking ring may be rotated into matching castellations formed on the socket in a bayonet manner; or the locking ring may be adhered, or welded by means of heat, solvent or ultra-sonics, to the socket.

It will be appreciated that the described locking ring is highly resistant to being twisted-off the socket under conditions of substantial axial and angular misalignment and movement of laid pipes. It will further be appreciated that the reception of the mouth 15 snugly within the continuous annular recess of the locking ring leads to a construction having considerable hoop strength precisely at the point where strength is most needed, namely at the mouth of the socket. It will further be appreciated that the socket is of uniform wall thickness throughout, and this leads to easier manufacture and more rapid manufacture, particularly when the socket is of injection moulded plastics material. Moreover the locking ring is also of substantially uniform wall thickness apart from the relatively slight thickening at projection 38, ameliorated by bevel 39. The locking ring is thus also easier and more rapid in manufacture when of injection moulded plastics material.

I claim:

1. A pipe coupling socket assembly comprising a socket having an outer surface and an inner surface and a mouth, a sealing ring positionable within said socket, a locking ring for locking said sealing ring in position, means for securing said locking ring to said socket, said locking ring being of channel section and comprising an outer flange extending adjacent said outer surface of the socket, a first radially outer base portion having an annular recess on the inner, transverse face thereof for receiving said mouth of the socket therein, a second radially inner base portion, and an inner flange, a portion of radially inner surface of said outer flange, the axial inner surface of said first base portion and the radially outer surface of said second base portion defining in combination said annular recess, said second base portion and said inner flange of the locking ring co-operating with said inner surface of the socket to define a substantially but not completely enclosed annular space, said sealing ring having an annular portion received and located in said annular space to lock said sealing ring in said position within said socket.

2. An assembly according to claim 1 wherein said inner surface of the socket includes a substantially radial annular surface portion facing the inner surface of said second base portion of the locking ring across said space.

3. An assembly according to claim 1 wherein the socket is of substantially uniform wall thickness.

4. An assembly according to claim 1 wherein the socket has an enlarged diameter end length terminating in said mouth.

5. An assembly according to claim 1 wherein said securing means comprises a substantially radial surface portion provided on the outer surface of the socket, said substantially radial surface portion facing away from said mouth, and wherein the locking ring includes an inward projection from said outer flange that engages said socket outer radial surface portion to secure the locking ring to the socket.

6. An assembly according to claim 5 wherein the socket and the locking ring are provided with co-operating cam surfaces to facilitate movement of the locking ring into a secured position on said socket.

7. An assembly according to claim 1 wherein said inner flange of the locking ring is of greater axial length than the axial dimension of said received and located annular sealing ring portion.

8. An assembly according to claim 1 wherein the sealing ring comprises said received and located annular sealing ring portion, an annular neck portion, and an annular sealing head, said neck portion connecting said annular sealing ring portion to said annular sealing head, and wherein said substantially enclosed annular space has an annular entrance, said annular neck portion extending through said annular entrance.

9. An assembly according to claim 8 wherein the sealing head lies further within said socket than said received and located annular portion of the sealing ring.

10. A pipe coupling socket assembly comprising a socket having an outer surface and an inner surface and a mouth, a sealing ring within said socket, a locking ring adapted for snap-fitting to said socket for locking said sealing ring in position, said locking ring comprising an outer flange extending adjacent said outer surface of the socket, a first radially outer base portion defining an annular recess on the inner, transverse face thereof for receiving said mouth of the socket therein, a second radially inner base portion, and an inner flange, a portion of the radially inner surface of said outer flange, the axial inner surface of said first base portion and the radially outer surface of said second base portion defining in combination said annular recess, said socket being of substantially uniform wall thickness and having an enlarged diameter end length terminating in said mouth to present an inner substantially radial annular surface portion facing and axially spaced from the inner surface of said second base portion of the locking ring, the enlarged diameter end length of the socket having an inner substantially axial surface facing and radially spaced from a surface of said inner flange of the locking ring; said second base portion, said inner flange and said inner two respective facing socket surfaces together defining a substantially enclosed annular space receiving and locating an annular portion of said sealing ring, said sealing ring comprising said received and located portion connected by an annular neck portion, which extends through an annular entrance to said substantially enclosed annular space, to an annular sealing head.

11. A pipe coupling socket assembly comprising a socket having an outer surface and an inner surface and a mouth, a sealing ring positionable within said socket, a locking ring for locking said sealing ring in position, means for securing said locking ring to said socket, said locking ring being of channel section and comprising an outer flange extending adjacent said outer surface of the socket, a first radially outer base portion defining an annular recess receiving said mouth of the socket, a second radially inner base portion, and an inner flange, said second base portion and said inner flange of the locking ring co-operating with said inner surface of the socket to define a substantially but not completely enclosed annular space, said sealing ring comprising an annular portion received and located in said annular space to lock said locking ring in said position within said socket, an annular neck portion, and an annular sealing head, said neck portion connecting said annular sealing ring portion to said annular sealing head, and wherein said substantially enclosed annular space has an annular entrance, said annular neck portion extending through said annular entrance, said sealing head being generally triangular in cross-section, each of its three major faces being concave, said sealing head being connected to said received and located annular portion of said sealing ring portion by said neck portion at one apex.

12. A pipe coupling socket assembly comprising a socket having an outer surface, an inner surface and a mouth, a sealing ring positionable within said socket, and a locking ring for locking said sealing ring in position, said locking ring being of channel section and comprising an outer flange extending adjacent said outer surface of the socket, an inner flange and an annular base interconnecting said inner and outer flanges, the annular base including an annular recess defined by portions of said outer flange and said annular base, and the mouth of the socket being positioned within and retained by said annular recess such that the socket cannot be skewed or moved radially inwardly or radially outwardly with respect to the ring, said inner flange of the locking ring cooperating with a portion of said annular base and with said inner surface of the socket to define a substantially but not completely enclosed annular space, said sealing ring having an annular portion retained within said annular space to lock the sealing ring in position within the socket.

13. A pipe coupling assembly comprising a socket having an outer surface and an inner surface and a mouth, a sealing ring positionable within said socket, a locking ring for locking said sealing ring in position, means for securing said locking ring to said socket, said locking ring being of channel section and comprising an outer flange extending adjacent said outer surface of the socket a first annular base portion having an annular recess on the inner, transverse face thereof for receiving said mouth of the socket therein, said annular recess in combination with said means for securing said locking ring to said socket thereby preventing axial or radial displacement of the locking ring with respect to the socket, a second annular base portion disposed radially inwardly of and axially spaced from said first base portion and having a radially outer surface to thereby define said annular recess in combination with said first annular base portion and a portion of said outer flange, and an inner flange, said second base portion and said inner flange of the locking ring co-operating with said inner surface of the socket to define a substantially but not completely enclosed annular space, said sealing ring having an annular portion received and located in said annular space to lock said sealing ring in said position with said socket.

* * * * *